United States Patent Office 3,468,888
Patented Sept. 23, 1969

3,468,888
2-SUBSTITUTED PYRIMIDO[1,2-a]
BENZIMIDAZOLES
Alfred W. Chow, Radnor, Pa., assignor to Smith Kline &
French Laboratories, Philadelphia, Pa., a corporation
of Pennsylvania
No Drawing. Filed Apr. 11, 1967, Ser. No. 629,936
Int. Cl. C07d 57/12; A61k 27/00
U.S. Cl. 260—256.4                                    12 Claims

ABSTRACT OF THE DISCLOSURE

Pyrimido[1,2-a]benzimidazol-2 - ones, optionally substituted at the 1, 3, or 4-positions, or in the benzene ring, prepared by condensation of a 2-aminobenzimidazole with an acryloyl chloride or a propiolic acid ester. 2-thiones are prepared by reaction of the 2-ones with $P_2S_5$. 2-amines are prepared by reaction of the 2-thiones with amines. The compounds possess diuretic activity.

---

The present invention relates to heterocyclic compounds having diuretic activity. In particular, the invention relates to pyrimido[1,2-a]benzimidazoles substituted in the 2-position with oxo, thio, or amino groups.

The compounds of the invention are represented by one of the following structural formulas:

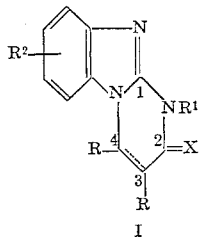   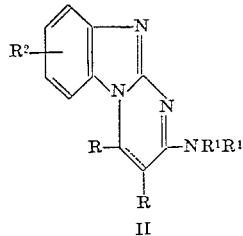

I                 II wherein:

X is oxygen or sulfur;
R is hydrogen or methyl, with the proviso that at least 1 R group is hydrogen;
$R^1$ is hydrogen or lower alkyl;
$R^2$ is hydrogen, lower alkyl, lower alkoxy, chloro, bromo, trifluoromethyl, or nitro; and the dotted line between the 3 and 4-positions represents an optical bond, with the proviso that when the R group at the 3-position is methyl, the bond between the 3 and 4-positions is a single bond.

The term "lower alkyl" is intended to represent an alkyl group having up to about four carbon atoms therein, including methyl, ethyl, propyl, and butyl. Methyl is preferred.

The compounds of the invention are prepared by procedures described hereinbelow. Compounds of Formula I where X is oxygen and the bond between the 3 and 4-position is a single bond are prepared by condensing a 2-aminobenzimidazole of Formula III with an acid chloride of Formula IV. The reaction is conducted preferably in the presence of a noninterfering

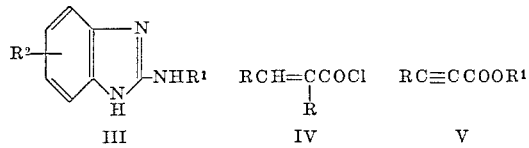

III             IV           V base such as triethylamine and approximately at room temperature. Use of a solvent such as acetone, tetrahydrofuran, or acetonitrile is desirable.

Compounds of Formula I where X is oxygen and the bond between the 3 and 4-positions is a double bond are prepared by condensing the 2-aminobenzimidazole III with a propiolic acid ester of Formula V. This reaction is preferably conducted in a refluxing solvent such as acetone.

As implied above, compounds of Formula I where $R^1$ is lower alkyl are generally prepared by using as starting material a 2-alkylaminobenzimidazole. However, such compounds may also be prepared by treating the pyrimidobenzimidazol-2-one where $R^1$ is hydrogen with a diazoalkane such as diazomethane.

Compounds where X is sulfur are prepared by refluxing the corresponding compound where X is oxygen with phosphorus pentasulfide in pyridine.

Compounds of Formula II are prepared by treating a compound of Formula I where $R^1$ is hydrogen and X is sulfur with ammonia, a lower alkylamine, or a dilower alkylamine, and heating in a solvent such as diglyme at about 120°.

The compounds of the invention, with the exception of the 2-alkylamino and dialkylaminopyrimidobenzimidazoles are capable of existing in alternate tautomeric forms. Thus, the 2-one and 2-thione compounds may exist as 2-hydroxy or 2-mercapto forms and the 2-amino compounds may exist as 2-imino forms. It should be understood that the structural and nomenclature designations utilized herein represent the probable predominant tautomers, but that it is considered that the invention relates to the compounds in either of the tautomeric forms.

Also part of the invention are the pharmaceutically acceptabe acid addition salts of the compounds of Formulas I and II. Such salts include the hydrochloride, hydrobromide, sulfate, maleate, benzoate, phosphate, tartrate, and nitrate. They are prepared by combining the basic compounds with one of the acids in the conventional manner, either or both of the reactants being in ethereal, alcoholic, or acetone solutions.

The compounds of the invention possess diuretic activity. They have been found to significantly increase the urine ouput of rats when administered orally in doses of 15–30 mg./kg. and dogs when administered parenterally in doses of 5 mg./kg. They are formulated for use in those situations where it is desired to increase the urine and electrolyte output by combining them with standard pharmaceutical excipients to form tablets, capsules, and injectables according to conventional techniques.

The 2-aminobenzimidazole starting materials are described in the literature, prepared by known methods, or prepared by ring-closure of an optionally substituted N-(o-aminophenyl)thiourea with mercuric oxide.

The following examples are intended to illustrate the preparation of the compounds of the invention, but are not to be construed as limiting the scope thereof. Temperatures stated are in degrees centigrade.

EXAMPLE 1

3,4-dihydropyrimido[1,2-a]benzimidazol-2(1H)-one

To a stirred solution of 26.6 g. (0.2 mole) of 2-aminobenzimidazole in 1 l. acetonitrile and 23.7 g. (0.235 mole) of triethylamine is added dropwise 20.0 g. (0.22 mole) of acryloyl chloride, keeping the temperature of the reaction at or below 25°. The 2-aminobenzimidazole dissolves followed by the appearance of a new solid. After the acryloyl chloride has been added the cooling bath is removed and stirring is continued for a further 1.5 hours at room temperature. The solid which forms is filtered off, washed with a little acetonitrile and dried. This material is suspended in 400 ml. of 50% ethanol and the pH of the mixture is adjusted to 11.5 by adding 40% NaOH. At this point water is added to dissolve all of the solid. The pH is then lowered to 7.1 with acetic acid. The solid which precipitates is filtered off, washed with a little 50% aqueous ethanol, and dried to give the title product, M.P. 253–256° with prior softening. Recrystallization is achieved from dimethylformamide; M.P. 260.5–262°.

EXAMPLE 2

Pyrimido[1,2-a]benzimidazol-2(1H)-one

To a solution of 15.0 g. (0.112 mole) of 2-aminobenzimidazole in 690 ml. of acetone is added 11.5 g. (0.115 mole) of ethyl propiolate. The resulting solution is refluxed 4.5 hours and the white solid which separates is filtered off to give the crude product. Two recrystallizations from dimethylformamide gives the purified product, M.P. 336–339°.

EXAMPLE 3

3,4-dihydro-4-methylprimido[1,2-a]benzimidazol-2(1H)-one

To a stirred and cooled solution of 50.0 g. (0.375 mole) of 2-aminobenzimidazole in 1250 ml. of acetone, 250 ml. of tetrahydrofuran, and 38.0 g. (0.375 mole) of triethylamine is added dropwise, during a period of 15 minutes, 41.8 g. (0.40 mole) of crotonyl chloride. The immediate reaction is exothermic. The mixture is stirred a further 6 hours at room temperature and filtered to yield an off-white solid, M.P. 232–242°. Recrystallization from ethanol gives the title compound as a white crystalline solid, M.P. 260–261.5°.

EXAMPLE 4

3,4-dihydro-3-methylpyrimido[1,2-a]benzimidazol-2(1H)-one

To a stirred solution of 50.0 g. (0.375 mole) of 2-aminobenzimidazole in 1250 ml. of acetone, 250 ml. of tetrahydrofuran, and 38.0 g. (0.375 mole) of triethylamine is added dropwise 41.8 g. (0.40 mole) of methacryloyl chloride. The immediate reaction is exothermic. After the addition, the reaction mixture is stirred another 5 hours at room temperature and filtered to give a crude solid. Crystallization from ethanol-water yields the title compound, M.P. 264–266°.

EXAMPLE 5

1-methylpyrimido[1,2-a]benzimidazol-2(1H)-one

From 2-methylaminobenzimidazole.—A solution of 3.0 g. (0.020 mole) of 2-methylaminobenzimidazole and 2.2 g. (0.0022 mole) of ethyl propiolate in 125 ml. acetone is refluxed for 20 hours. The solvent is removed and the solid residue is triturated with cold ethyl acetate to give the crude product. This is recrystallized form ethyl acetate to give the title compound as long needles, M.P. 178–180°.

From pyrimido[1,2-a]benzimidazol-2(1H)-one.—To a solution of 0.5 g. (0.002 mole) of pyrimido-[1,2-a]benzimidazol-2(1H)-one in a mixture of 70 ml. of methanol and 50 ml. of dimethylformamide is added an ethereal solution of diazomethane (generated from 1 g. of N-nitrosomethylurea and 40% KOH). This mixture is allowed to stand for 4.5 hours in an ice-bath, after which the reaction mixture is concentrated in vacuo to remove all solvents. The residue is recrystallized from ethyl acetate using charcoal to give the title compound, M.P. 174–178°.

Use of diazoethane in place of diazomethane gives the 1-ethyl compound.

EXAMPLE 6

Pyrimido[1,2-a]benzimidazole-2(1H)-thione

A mixture of pyrimido[1,2-a]benzimidazol-2(1H)-one (1.6 g., 0.01 mole), 4.6 g. of $P_2S_5$, and 140 ml. of dry pyridine is refluxed 1.5 hours, cooled, and the dark colored reaction mixture is concentrated in vacuo to a yellow residue. This residue is heated to boiling with 100 ml. of water and the yellow solid which remains is filtered, washed with hot water and dried to give the crude product. Recrystallization from dimethylformamide gives the compound as yellow needles, M.P. 310–313° dec.

EXAMPLE 7

2-aminopyrimido[1,2-a]benzimidazole

A mixture of 2.01 g. (0.01 mole) of pyrimido[1,2-a]benzimidazole-2(1H)-thione in 100 ml. of diglyme is heated to 120°, and dry $NH_3$ is passed into the solution for 3 hours. The reaction mixture is added to ice water and the title compound is filtered off and dried.

Substituting methylamine for $NH_3$ gives the 2-methylamino derivative; when dimethylamine is used, the 2-dimethylamino derivative is obtained.

EXAMPLE 8

4-methyl-2-propylpyrimido[1,2-a]benzimidazol-2(1H)-one

When 2-propylaminobenzimidazole is condensed with ethyl tetrolate according to the procedure of Example 5, the title product is obtained.

When this product is treated with $P_2S_5$ according to the procedure of Example 6, 4-methyl-2-propylpyrimido-[1,2-a]benzimidazole-2(1H)-thione is obtained.

EXAMPLE 9

Treatment of the products of Examples 1, 3, 4, or 5 with $P_2S_5$ according to the procedure of Example 6 gives 3,4 - dihydropyrimido[1,2-a]benzimidazole - 2(1H)-thione, 3,4 - dihydro-4 - methylpyrimido[1,2-a]benzimidazole - 2(1H) - thione, 3,4 - dihydro-3 - methylpyrimido-[1,2-a]benzimidazole - 2(1H)-thione, or 1 - methylpyrimido[1,2-a]benzimidazole - 2(1H)-thione, respectively.

EXAMPLE 10

Use of 2-amino-4 - methylbenzimidazole, 2 - amino-5-chlorobenzimidazole, 2 - amino - 5 - butylbenzimidazole, 2 - amino - 5 - propoxybenzimidazole, or 2-amino-5-nitrobenzimidazole in the procedure of Example 1 in place of 2-aminobenzimidazole results in the formation of 3,4-dihydro - 9 - methylpyrimido[1,2 - a]benzimidazol-2(1H)-one, 3,4 - dihydro - 8 - chloropyrimido[1,2 - a]benzimidazol-2(1H) - one, 3,4 - dihydro-8-butylpyrimido[1,2-a] benzimidazol - 2(1H) - one, 3,4 - dihydro-8-propoxypyrimido[1,2-a]benzimidazol-2(1H) - one, or 3,4 - dihydro-8 - nitropryrimido[1,2 - a]benzimidazol - 2(1H)-one, respectively.

Reaction with $P_2S_5$ as in Example 6 gives the 2-thione products, and reaction of these compounds with amines as in Example 7 gives the amino products.

EXAMPLE 11

2-aminobenzimidazole

To a mixture of 8.5 g. of HgO in 50 ml. of absolute ethanol at 70° is added over a 5 minute period 1.41 g. (0.0084 mole) of N-(o-aminophenyl)thiourea. The mixture is then stirred at 70–75° for 15 min. after the addition is complete and an additional 4 g. of HgO added. Further addition of 8 g. of HgO in 2 portions and heating over a 15 min. interval results in completion of the reaction. The mixture is vacuum-filtered while hot and the filtrate evaporated at 40° to give an 84% yield of the title product as a crystalline solid, M.P. 225–228°.

I claim:
1. A compound of one of the following formulas:

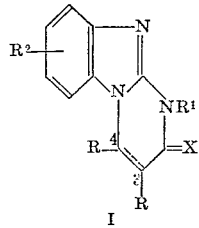

I

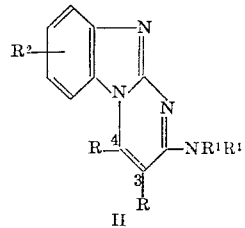

II wherein:

X is oxygen or sulfur;
R is hydrogen or methyl, with the proviso that at least 1 R group is hydrogen;
$R^1$ is hydrogen or lower alkyl;
$R^2$ is hydrogen, lower alkyl, lower alkoxy, chloro, bromo, or trifluoromethyl; and
the dotted line between the 3 and 4-positions represents an optional bond, with the proviso that when the R group at the 3-position is methyl, the bond between the 3 and 4-positions is a single bond, or a pharmaceutically acceptable acid addition salt thereof.

2. A compound as claimed in claim 1, where the compound is of Formula I.
3. A compound as claimed in claim 2, where X is oxygen and $R^2$ is hydrogen.
4. A compound as claimed in claim 3, where R and $R^1$ are hydrogen or methyl.
5. A compound as claimed in claim 4, being the compound 3,4 - dihydropyrimido[1,2-a]benzimidazol-2(1H)-one.
6. A compound as claimed in claim 4, being the compound pyrimido[1,2-a]benzimidazol-2(1H)-one.
7. A compound as claimed in claim 4, being the compound 3,4 - dihydro - 4 - methylpyrimido[1,2-a]benzimidazol-2(1H)-one.
8. A compound as claimed in claim 4, being the compound 3,4-dihydro-3-methylpyrimido[1,2-a]benzimidazol-2(1H)-one.
9. A compound as claimed in claim 4, being the compound 1-methylpyrimido[1,2-a]benzimidazol-2(1H)-one.
10. A compound as claimed in claim 2, being the compound pyrimido[1,2-a]benzimidazole-2(1H)-thione.
11. A compound as claimed in claim 1, where the compound is of Formula II.
12. A compound as claimed in claim 11, being the compound 2-aminopyrimido[1,2-a]benzimidazole.

References Cited

De Cat et al., Chem. Abstracts, vol. 46 (1952), col. 5020.

Ochiai et al., Chem. Abstracts, vol. 35 (1941), cols. 743–4.

Ridi et al., Chem. Abstracts, vol. 49 (1955), cols. 4658–9.

ALEX MAZEL, Primary Examiner

R. J. GALLAGHER, Assistant Examiner

U.S. Cl. X.R.

260—256.5, 309.2, 486, 544; 424—251